Figure 16:
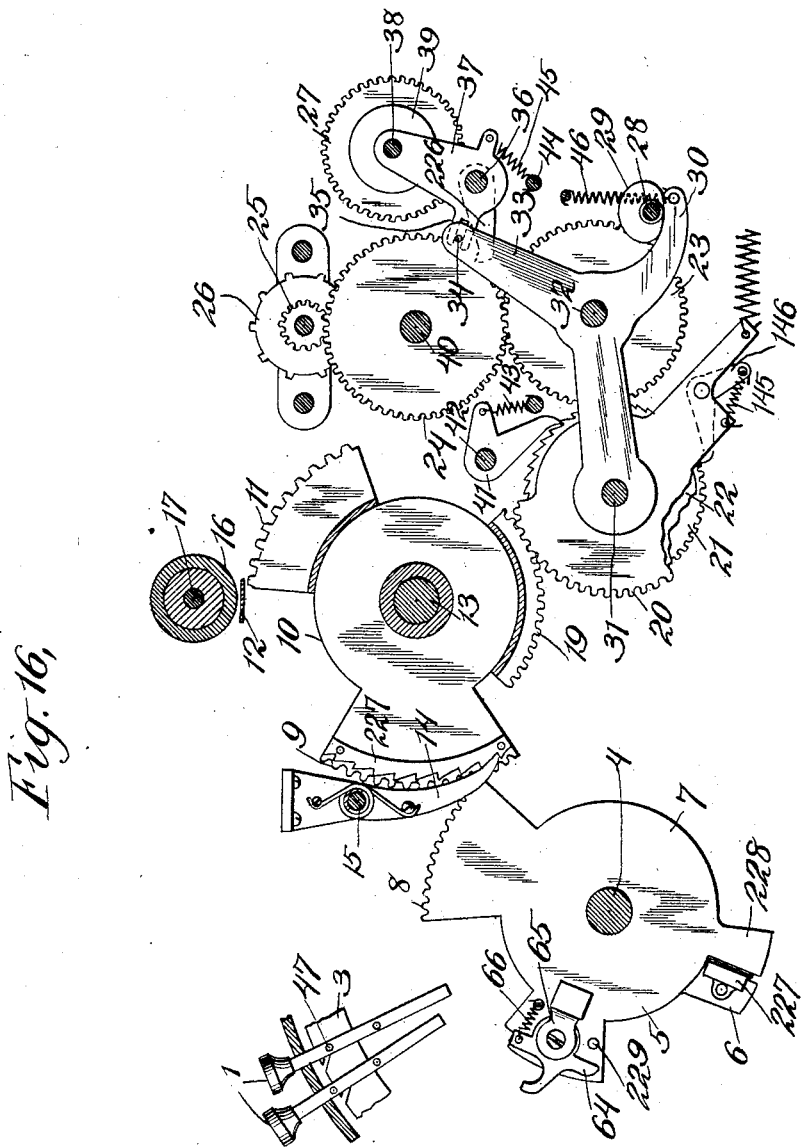

No. 745,149. PATENTED NOV. 24, 1903.
W. LE G. BUNDY & A. R. BOYNTON.
CALCULATING MACHINE.
APPLICATION FILED SEPT. 9, 1901.
NO MODEL. 12 SHEETS—SHEET 1.
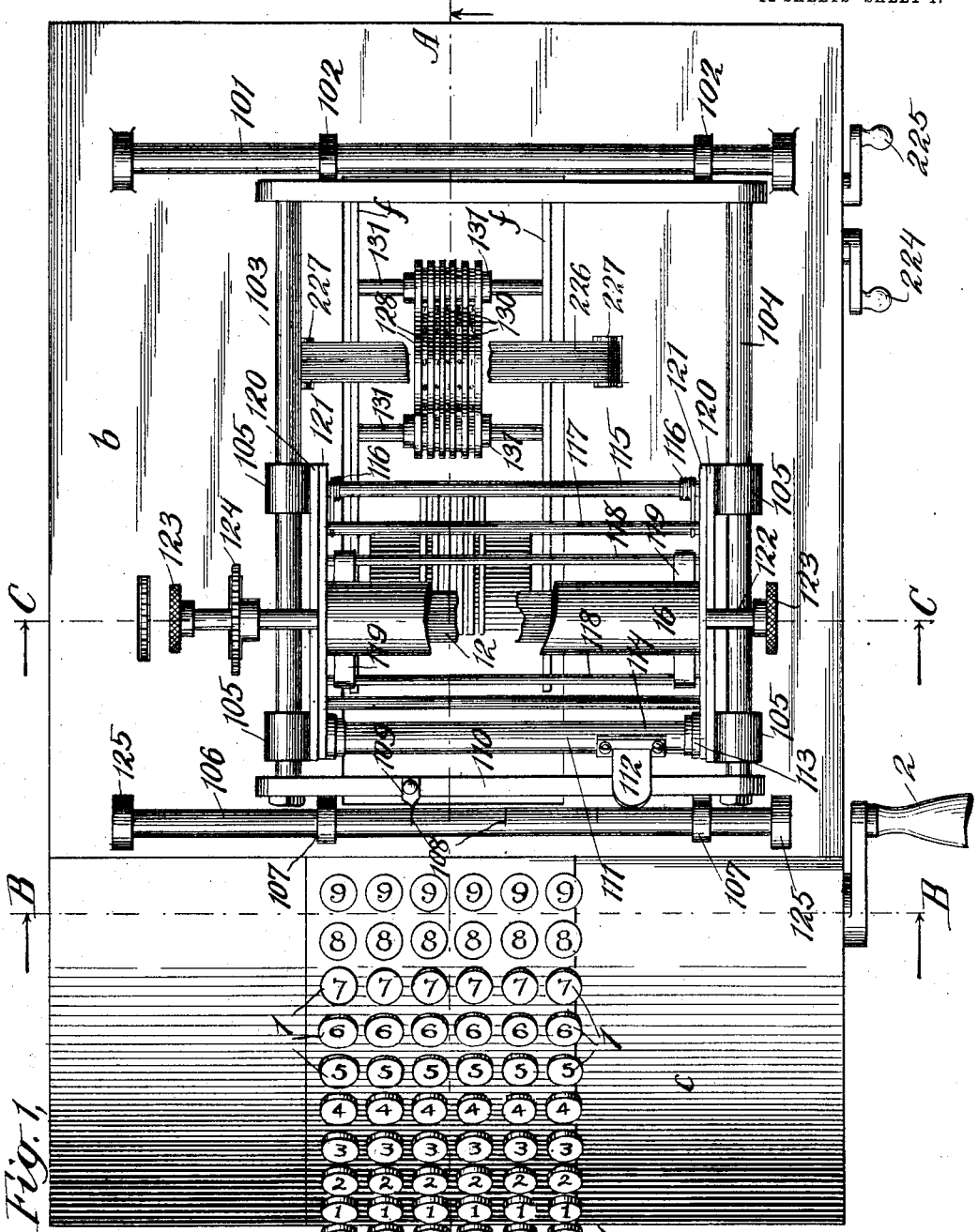
WITNESSES:
Timothy E Raftery
John O. Gempler
INVENTORS
Willard Le Grand Bundy
Alonzo R. Boynton
BY Kenyon & Kenyon
ATTORNEYS No. 745,149. PATENTED NOV. 24, 1903.
W. LE G. BUNDY & A. R. BOYNTON.
CALCULATING MACHINE.
APPLICATION FILED SEPT. 9, 1901.
NO MODEL. 12 SHEETS—SHEET 2.
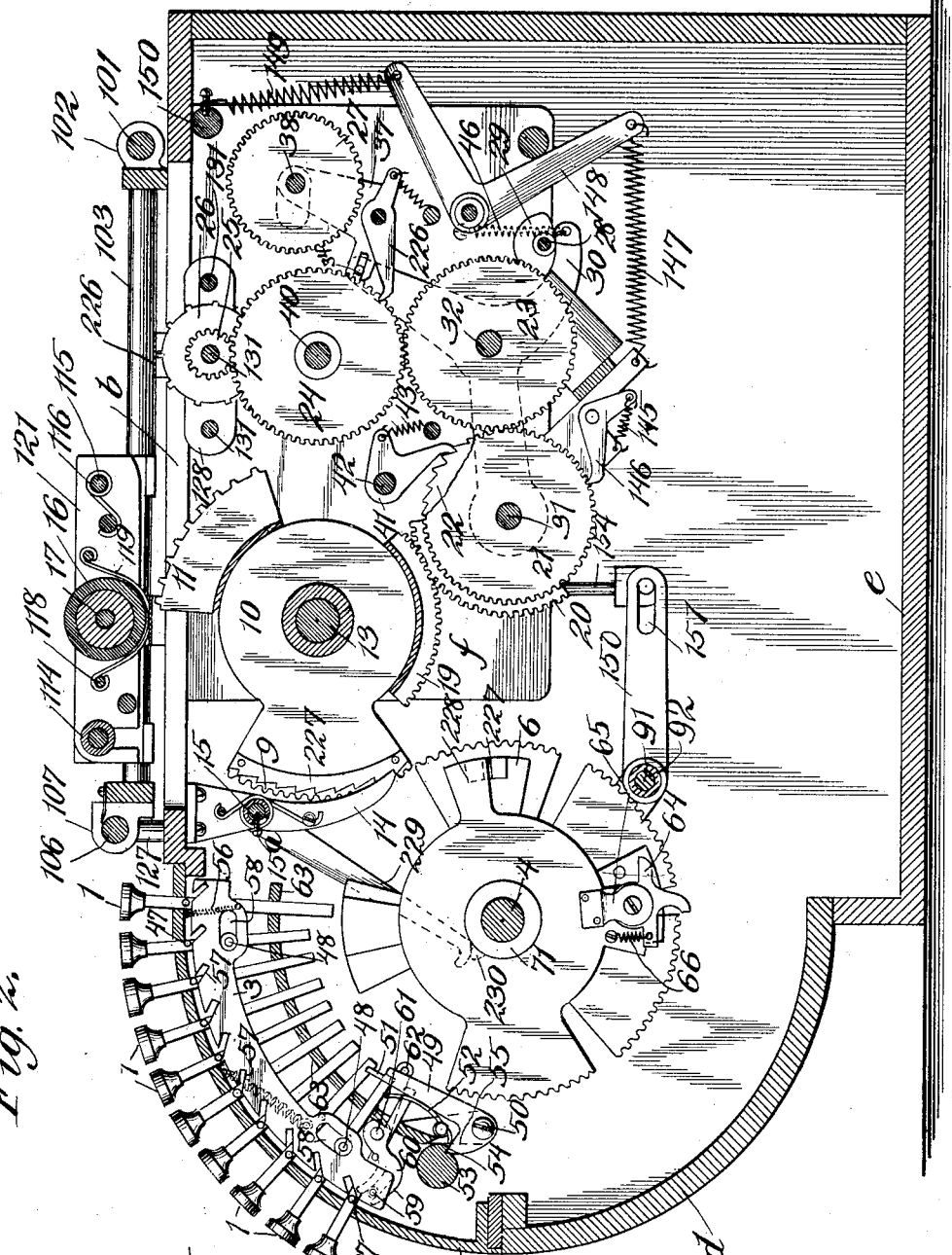
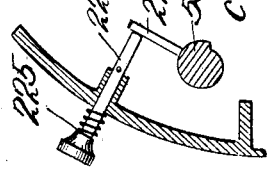
WITNESSES:
Timothy E Raftery
John O. Templer
INVENTORS
Willard LeGrand Bundy
Alonzo R. Boynton
BY
Kenyon & Kenyon
ATTORNEYS

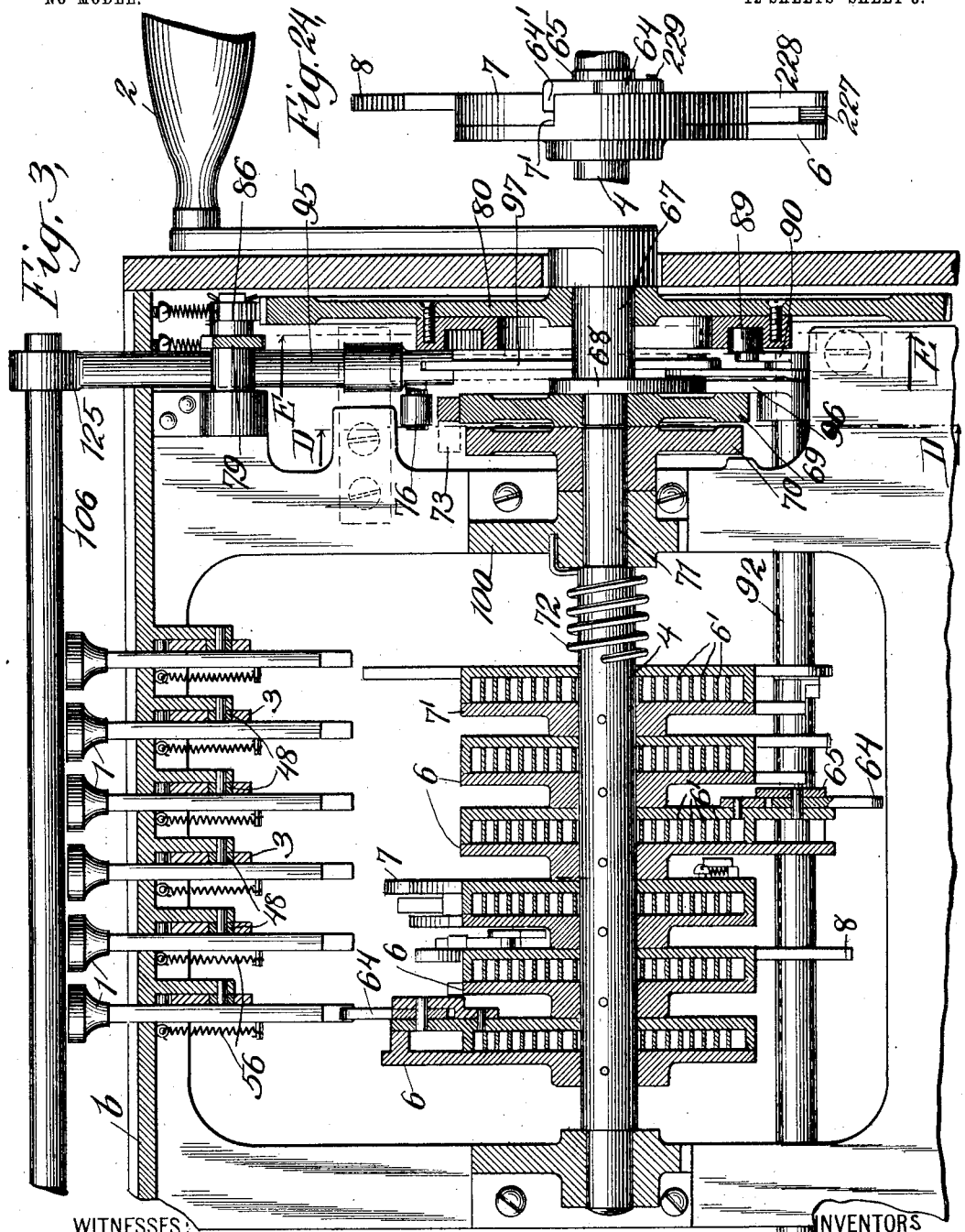

No. 745,149. PATENTED NOV. 24, 1903.
W. LE G. BUNDY & A. R. BOYNTON.
CALCULATING MACHINE.
APPLICATION FILED SEPT. 9, 1901.
NO MODEL. 12 SHEETS—SHEET 4.
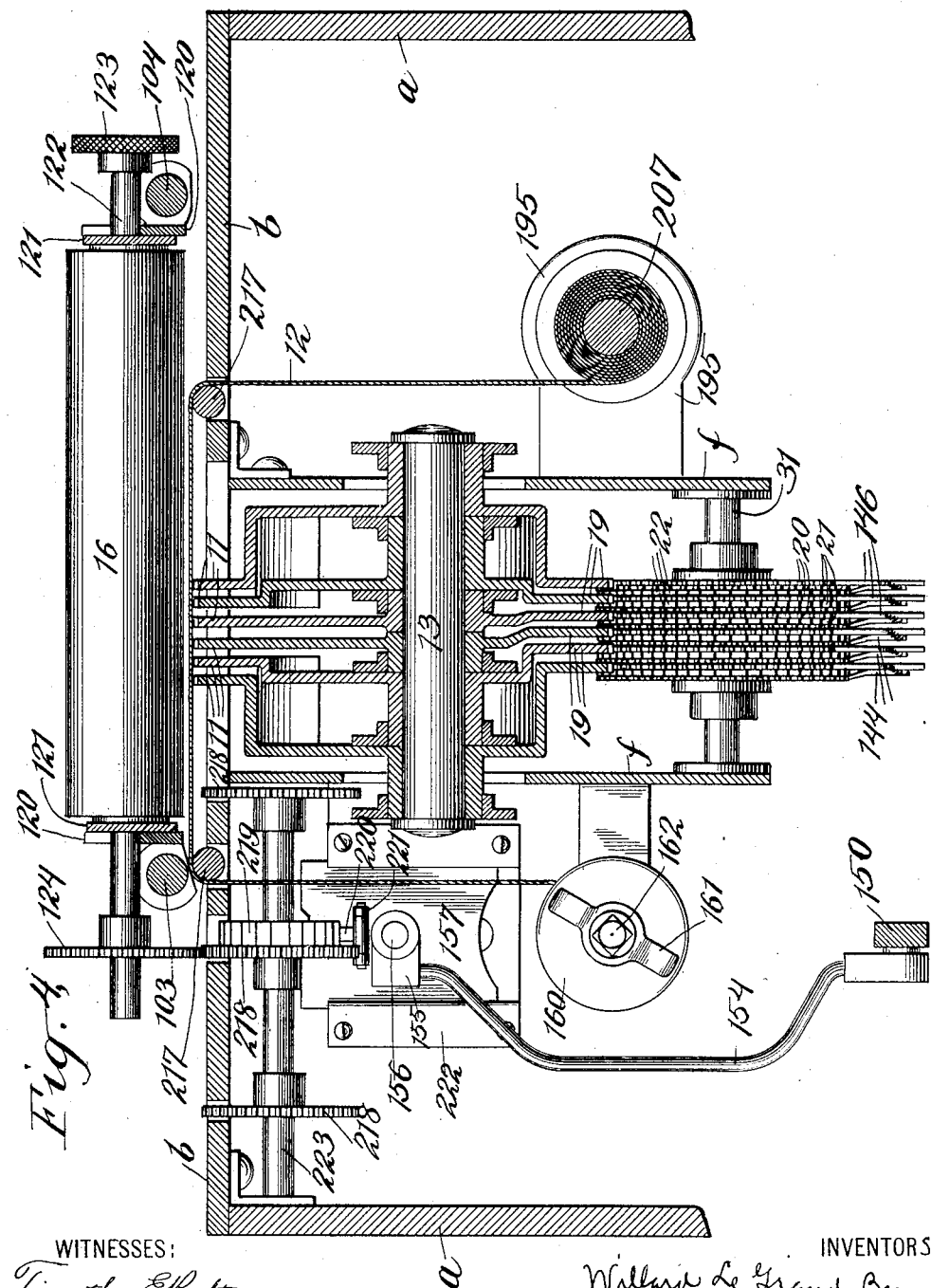
WITNESSES:
Timothy E Raftery
John O. Gimpler
INVENTORS
Willard LeGrand Bundy
Alonzo R. Boynton
BY
Kenyon & Kenyon
ATTORNEYS No. 745,149. PATENTED NOV. 24, 1903.
W. LE G. BUNDY & A. R. BOYNTON.
CALCULATING MACHINE.
APPLICATION FILED SEPT. 9, 1901.
NO MODEL. 12 SHEETS—SHEET 5.
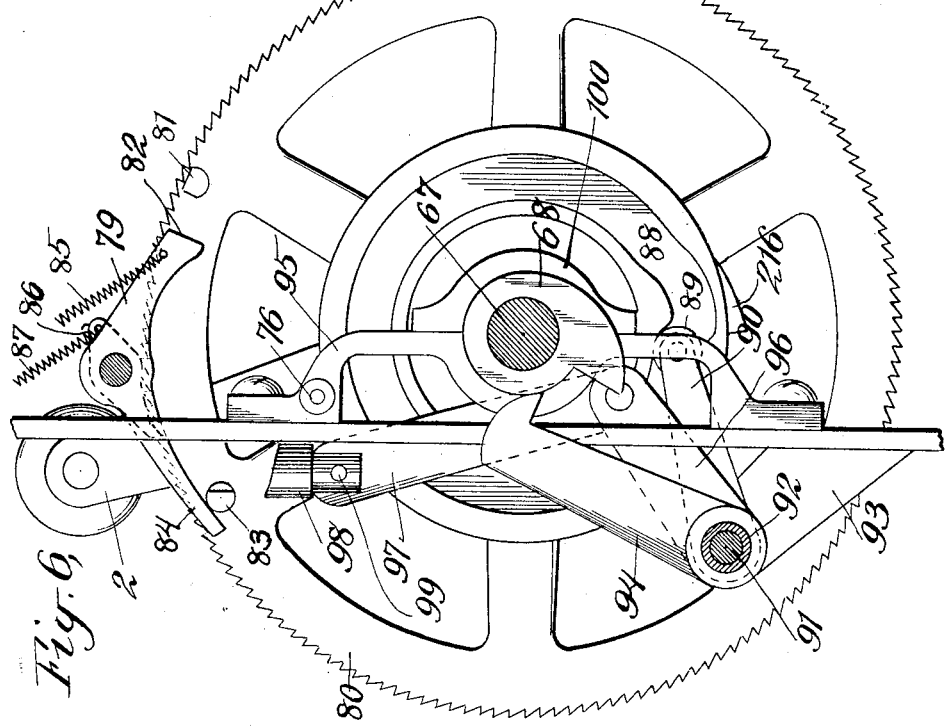
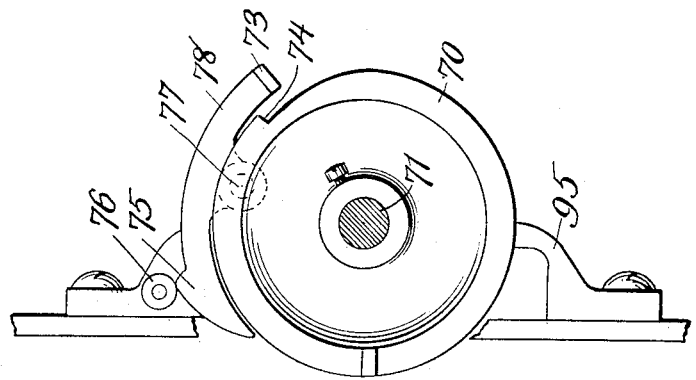

No. 745,149. PATENTED NOV. 24, 1903.
W. LE G. BUNDY & A. R. BOYNTON.
CALCULATING MACHINE.
APPLICATION FILED SEPT. 9, 1901.
NO MODEL. 12 SHEETS—SHEET 6.
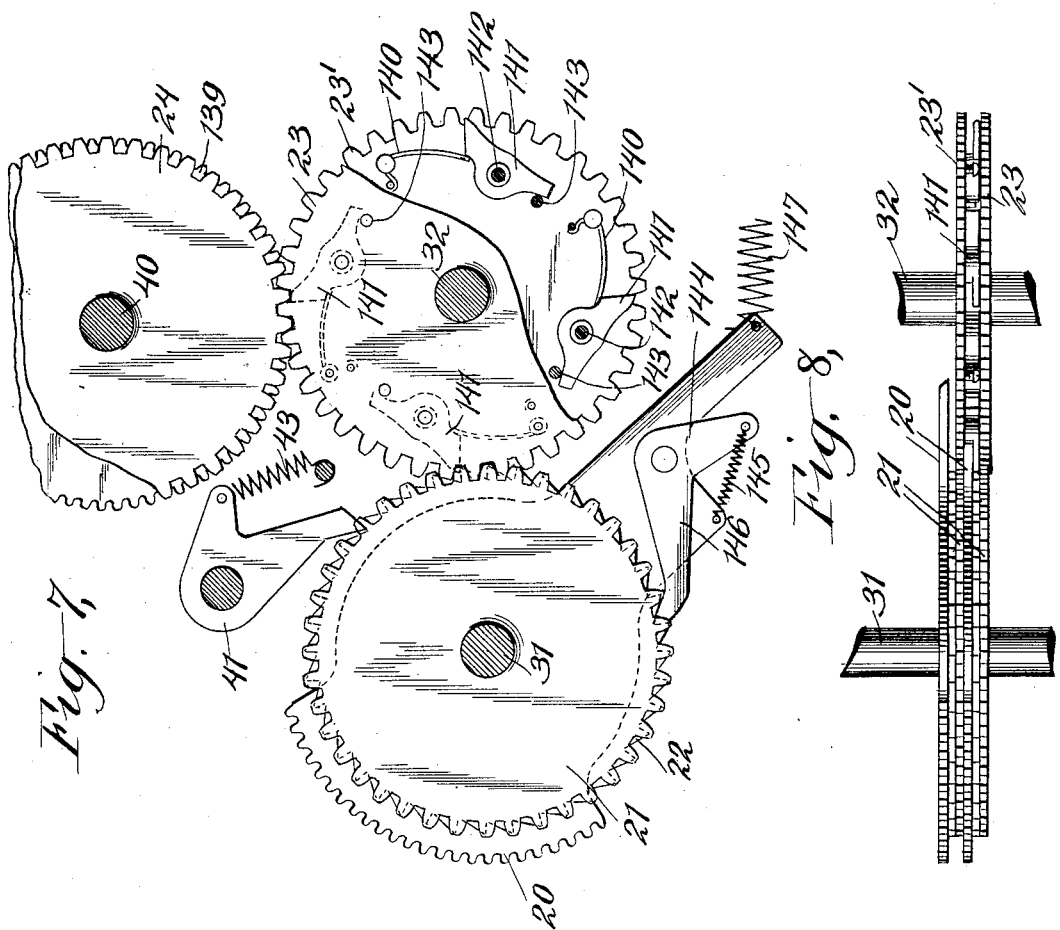

No. 745,149. PATENTED NOV. 24, 1903.
W. LE G. BUNDY & A. R. BOYNTON.
CALCULATING MACHINE.
APPLICATION FILED SEPT. 9, 1901.
NO MODEL. 12 SHEETS—SHEET 7.
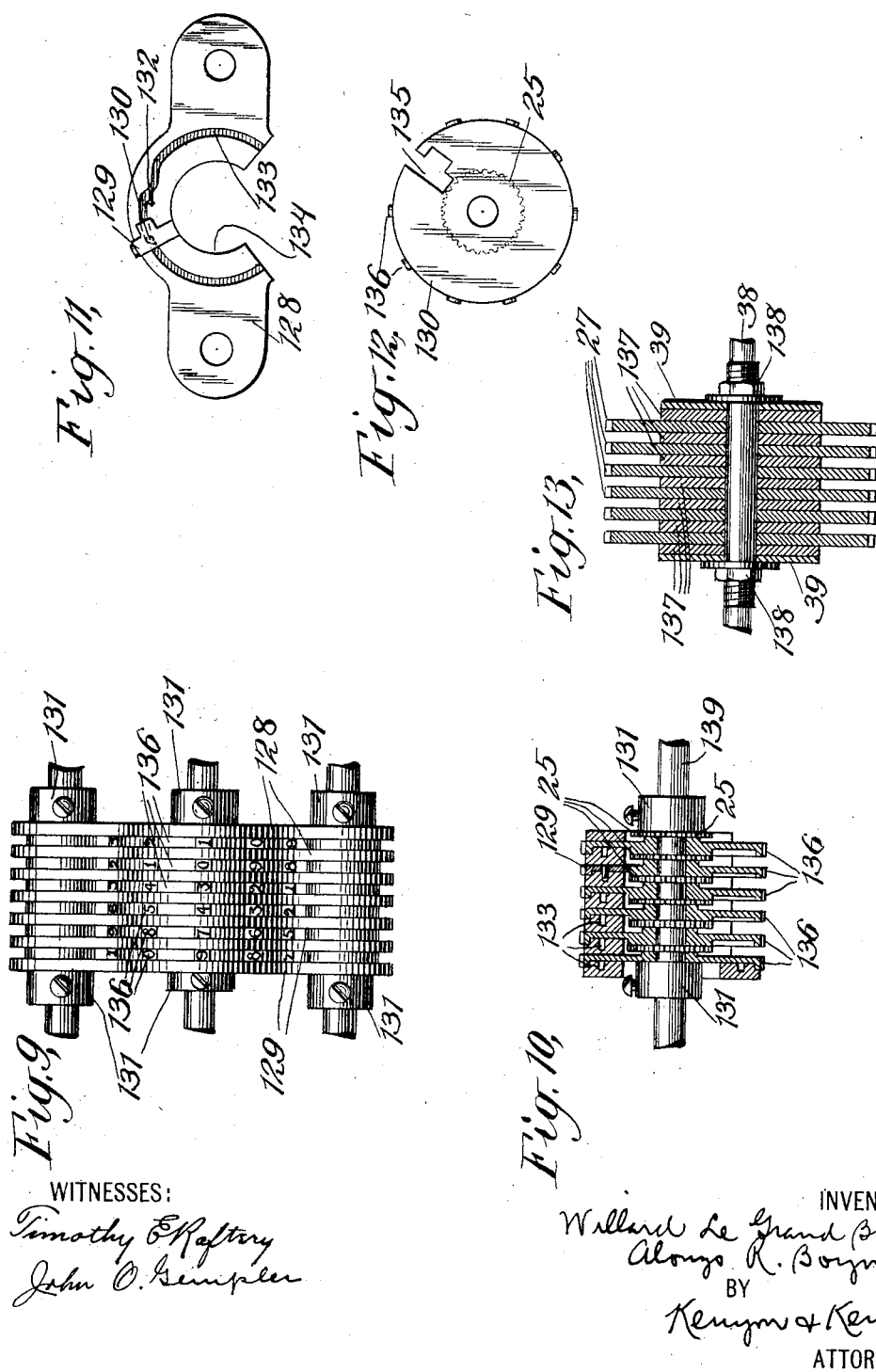

No. 745,149. PATENTED NOV. 24, 1903.
W. LE G. BUNDY & A. R. BOYNTON.
CALCULATING MACHINE.
APPLICATION FILED SEPT. 9, 1901.
NO MODEL. 12 SHEETS—SHEET 8.
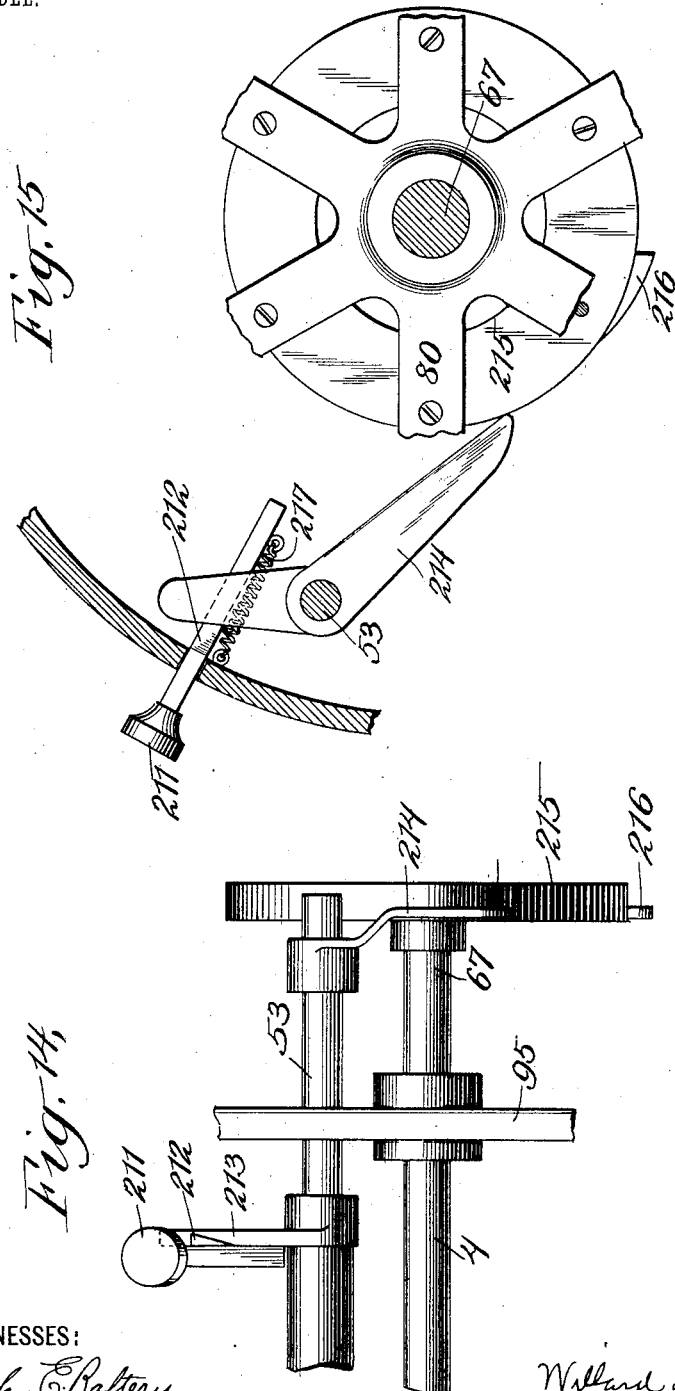
WITNESSES:
Timothy E. Raftery
John O. Gempler
INVENTORS
Willard LeGrand Bundy
Alonzo R. Boynton
BY
Kenyon & Kenyon
ATTORNEYS No. 745,149. PATENTED NOV. 24, 1903.
W. LE G. BUNDY & A. R. BOYNTON.
CALCULATING MACHINE.
APPLICATION FILED SEPT. 9, 1901.
NO MODEL. 12 SHEETS—SHEET 10.

WITNESSES:
Timothy C Raftery
John O Gempler

INVENTORS
Willard Le Grand Bundy
Alonzo R Boynton
BY
Kenyon & Kenyon
ATTORNEYS

No. 745,149. PATENTED NOV. 24, 1903.
W. LE G. BUNDY & A. R. BOYNTON.
CALCULATING MACHINE.
APPLICATION FILED SEPT. 9, 1901.
NO MODEL. 12 SHEETS—SHEET 11.
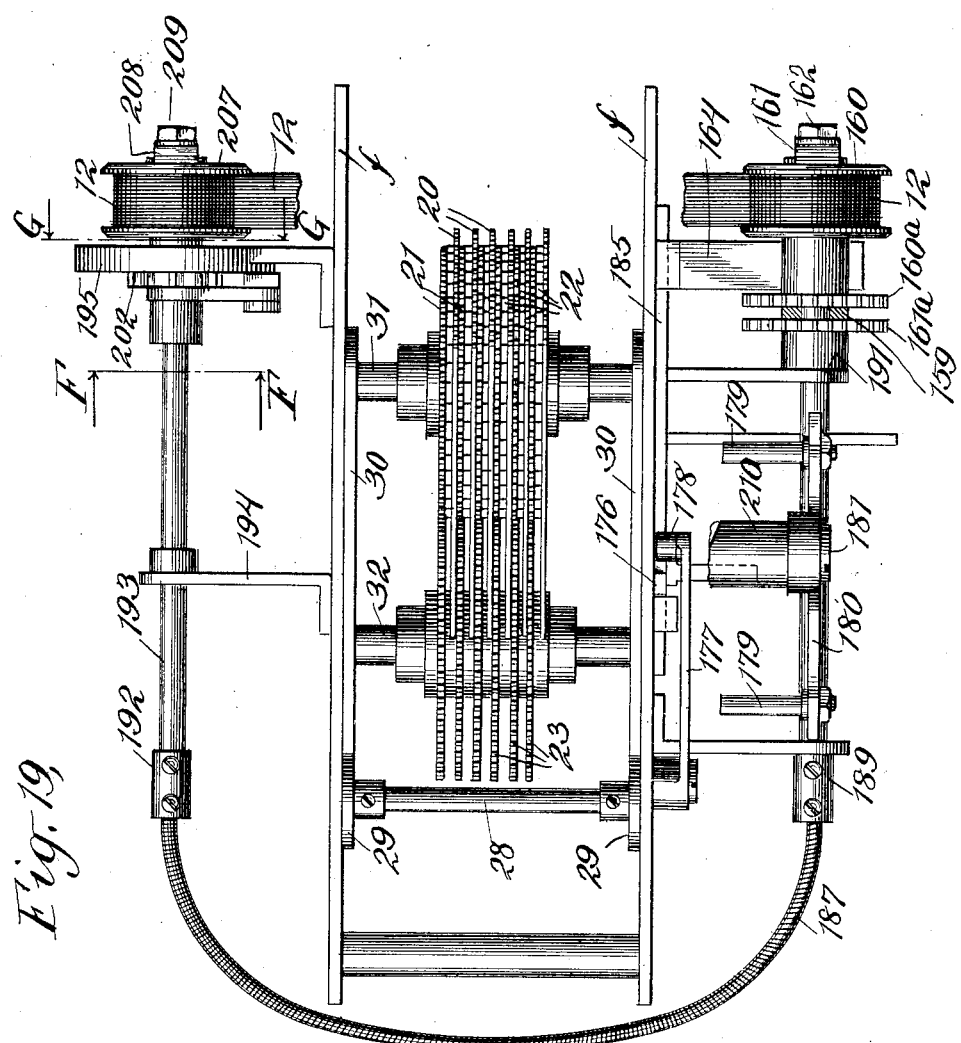
WITNESSES:
Timothy E Raftery
John O. Templer
INVENTORS
Willard Le Grand Bundy
Alonzo R. Boynton
BY
Kenyon & Kenyon
ATTORNEYS

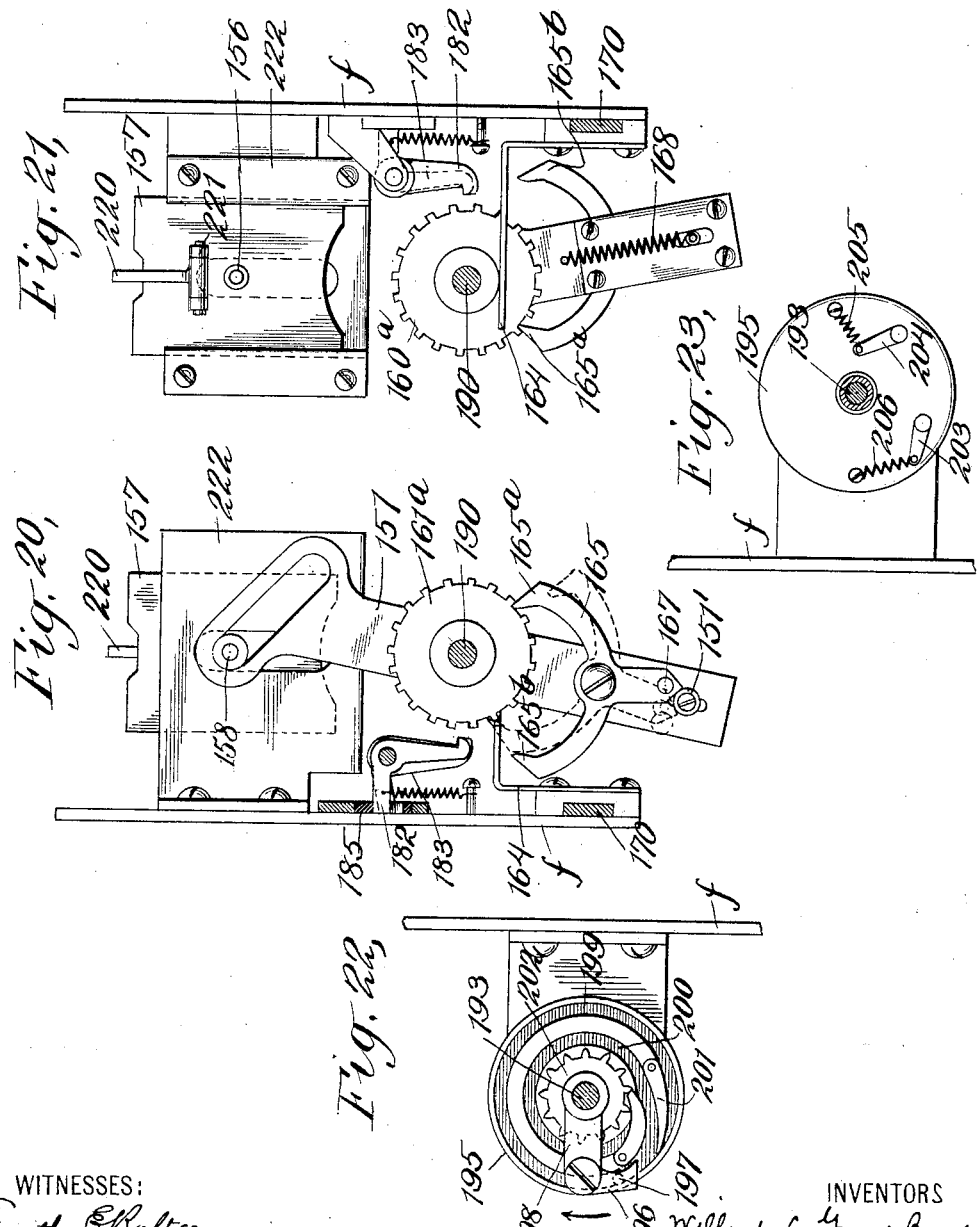

No. 745,149.  
Patented November 24, 1903.

UNITED STATES PATENT OFFICE.

WILLARD LE GRAND BUNDY AND ALONZO R. BOYNTON, OF BINGHAMTON, NEW YORK, ASSIGNORS TO THE BUNDY MANUFACTURING COMPANY, A CORPORATION OF NEW YORK.

CALCULATING-MACHINE.

SPECIFICATION forming part of Letters Patent No. 745,149, dated November 24, 1903.

Application filed September 9, 1901. Serial No. 74,795. (No model.)

*To all whom it may concern:*

Be it known that we, WILLARD LE GRAND BUNDY and ALONZO R. BOYNTON, citizens of the United States, and residents of Binghamton, in the county of Broome and State of New York, have invented certain new and useful Improvements in Calculating-Machines, of which the following is a specification.

Our invention relates to calculating-machines and to machines for bringing suitable characters upon a printing, reading, or adding line. It has for its object to improve and simplify such machines and to reduce their cost, to make them easier and more certain in operation, and generally to improve the construction and mode of operation of such machines; also, to provide improved means for preventing the actuation at the same time of more than one key of a series and for locking in their set position such keys as are operated until the machine has completed its work and means, preferably automatic, for releasing such keys, preferably all at the same time; also, means for preventing the release of keys that have been set at the close of the operation of the machine in order to permit the printing a second time of the characters represented by the set keys; also, means for releasing the keys after they have been set and before the machine has been operated to remedy mistakes that may have been made in setting the keys; also, to provide new and improved and simplified means for operating such machines and for actuating the main parts of the machine from one source of power and by one simple movement, preferably by the turning of a crank; also, to cause the operating-crank to always turn in the same direction; also, to provide a new and improved shaft to transmit motion to the type-wheels and adding-wheels adapted to permit the operating-crank to be turned in one direction only, and yet to allow the type-wheels to be moved independently of each other to their proper respective positions and to be returned to their original positions when the work of the machine is completed after each operation of the machine; also, to provide new and improved connections between such a shaft and the type or adding wheels; also, to stop the crank at the end of each revolution to prevent a too rapid actuation of the parts of the machine; also, to provide new and improved means for holding the type-wheels in set position and for releasing them and returning them to their original positions; also, new and improved carrying devices in the adding mechanism which will be simple in construction and certain in operation; also, to provide means for resetting the total-adding wheels capable of being thrown out of operative position during the ordinary adding operation; also, to provide means for severing the connection between the total-adding wheels and driving mechanism of the machine for the purpose of resetting the former without affecting the driving mechanism; also, to provide means for preventing the printing of unnecessary ciphers; also, new and improved means for feeding the paper strip.

Our invention consists in the novel devices and combinations herein shown and described.

Our improvement is shown in connection with a calculating-machine adapted for bringing numbers mounted upon suitable type-wheels upon a printing or reading line and in connection therewith for adding the numbers set up from time to time upon the machine. It can be used, however, in part, at least, in machines in which other characters than numbers are used and in which the characters are set up either for printing or reading purposes or for adding purposes, or for any two or all of these purposes.

In the drawings accompanying this specification and forming part hereof we have shown and will now proceed to describe a machine embodying our invention in its preferred form.

In the drawings similar reference characters in the different figures represent corresponding parts.

Referring now to the specific embodiment of our invention shown in the drawings, Figure 1 is a plan view of such a machine with certain parts broken away. Fig. 2 is a vertical longitudinal section on the line A A of Fig. 1 viewed as shown by the arrows. Fig.

Figures 17, 18:
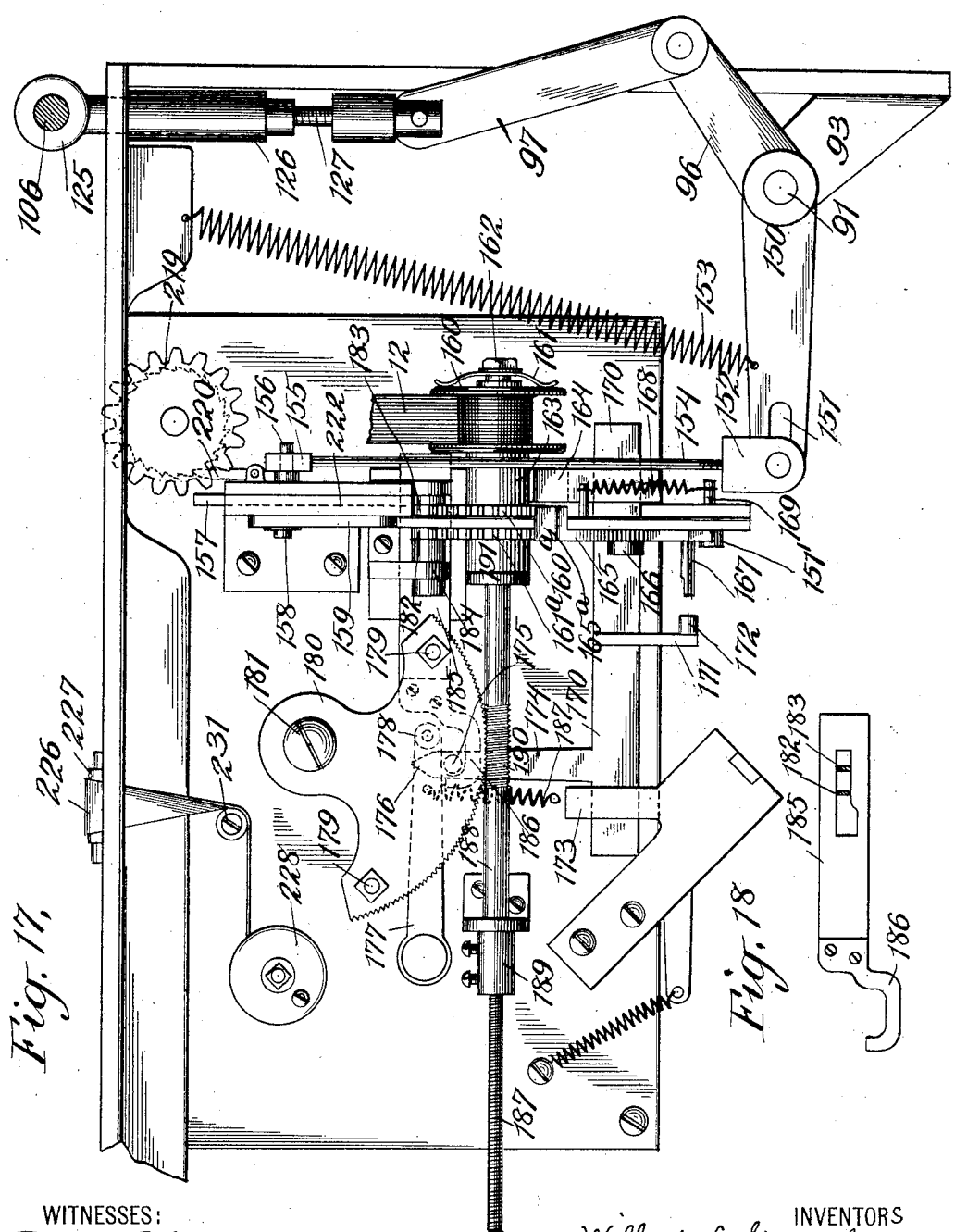

3 is a vertical cross-section taken on the line B B of Fig. 1 viewed as shown by the arrows. Fig. 4 is a similar view taken on the line C C of Fig. 1. Fig. 5 is a vertical longitudinal section taken on the line D D of Fig. 3. Fig. 6 is a similar view taken on the line E E of Fig. 3. Figs. 7 and 8 are details of the adding and carrying mechanism. Fig. 9 is a plan of the total-adding wheels. Fig. 10 is a central vertical section of the same. Fig. 11 is a detail of one of the stationary plates intervening between the total-adding wheels. Fig. 12 is one of the total-adding wheels. Fig. 13 is a cross-section through a set of resetting-wheels. Figs. 14 and 15 are details of the reprinting mechanism. Fig. 16 is a diagrammatic view intended to illustrate one movement throughout the machine. Fig. 17 is a side view of the ink-ribbon-feed mechanism. Fig. 18 is a detail view of the pawl-changing plate for reversing the ink-ribbon feed. Fig. 19 is a plan of the ink-ribbon-feeding mechanism. Fig. 20 is a rear view of the ink-ribbon-feeding device, and Fig. 21 is a front view of the same. Fig. 22 is a section on the line F F of Fig. 19. Fig. 23 is a section on line G G of Fig. 19. Fig. 24 is a detached view of one of the wheels on the main driving-shaft, showing the fast and loose parts of the wheel and connections. Fig. 25 is a detail of the device for releasing the set keys without operating the machine, and Figs. 26 and 27 are details of the device for locking the swinging support to the carriage of the impression-roller.

Before proceeding to describe in detail the embodiment of our invention shown in the drawings we will for purposes of clearness first briefly describe the work done by that machine, referring in this connection more particularly to Figs. 1, 2, and 16. Our said machine is provided with a bank of keys 1, arranged in series in the usual way. The machine is operated by depressing the suitable keys and by turning a crank 2. Each key as it is depressed or set is locked in its set position and is automatically released toward the end of the revolution of crank 2, and whenever one key of a series is moved to its set position it locks all of the other keys of the same set, so that none of them can be depressed until the first key has been returned to its original position after the operation of printing or adding has been accomplished. This locking of the keys in their set position and the locking of all of the other keys in a series when one is operated to prevent the operation of the others are effected by means of locking-plates 3 and their connections, presently to be described, one of these locking-plates 3 being provided for each series of the bank of keys. As each key is moved into set position the lower end of its shaft is depressed, as shown in Fig. 16, and is projected into the path of a projection from one of a set of wheels arranged upon a shaft 4, which is rotated by crank 2 in a manner presently to be described. One of these wheels is shown in Fig. 16 at 5. As many wheels 5 are provided upon shaft 4 as there are series of keys. Each wheel 5 is composed in the form shown in the drawings of two parts—one part 6, which is fast to shaft 4, and the part 7, which is loosely mounted upon the shaft. When shaft 4 rotates as crank 2 is turned, the fast parts 6 of these wheels cause the loose parts 7 of wheels 5 to rotate. This is done by means of a detachable lock, presently to be described, which at times connects parts 6 and 7 rigidly together and at other times is freed, so as to disconnect them. Normally the lock connects the parts 6 and 7 together. As shaft 4 rotates a projecting portion of the loose part 7 of the wheel strikes against the stop formed by the inner end of the depressed key 1. This causes the detachable lock connecting parts 6 and 7 to be freed, disconnecting those parts and permitting part 5 to rotate onward with shaft 4 and crank 2, while the loose part 7 is held against the stop-key 1. Of course the distance traversed by wheel 5 before it comes to a stop depends upon which one of the keys of the series is depressed—key 9, for example, allowing a farther rotation than any lower key. Teeth 8 upon a segment of wheel 5 mesh with teeth 9 upon a segment of type-wheel 10, the latter carrying type 11, adapted to be brought upon a printing or reading line 12 as type-wheel 10 is rotated. Type-wheels 10 are loosely arranged upon a shaft 13, and one type-wheel is provided for each series of the bank of keys. The number of each type-wheel brought upon the printing-line will of course be dependent upon the key depressed in its series of keys. The type-wheels 10 are held in set position by a series of spring-pressed pawls 14, mounted upon a shaft 15.

A strip of paper upon which the numbers that have been set up on the printing-line are to be printed is passed below impression or platen roller 17, the latter giving suitable printing pressure.

By depressing any one or more keys and turning crank 2 a number composed of the digits corresponding with those of the depressed keys will be brought upon the printing-line and will be printed upon the paper. At the same time and by the same operation the number thus set up will be added upon the total-adding wheels 26. There is of course one of these wheels for each series of keys. Motion is transmitted from type-wheels 10 through teeth 19 to the total-adding wheels through a series of reciprocating toothed segments 20 and transferring-wheels 21, 22, 23, and 24 and gears 25 on the shaft of the total-adding wheels, suitable pawls being employed to prevent backward rotation of the parts of the transferring-wheels and suitable mechanism for carrying from one wheel to the next higher wheel, all of which will be presently described. In this way each number that is set up on the printing or reading line is also added to the numbers on the adding or type line of total-adding wheels 26. An impression of the total may be obtained at any time through any suitable means. For this purpose we show an ink-ribbon 226, upon which a piece of paper may be placed and pressure obtained in any suitable way to obtain the printed total.

In the course of rotating crank 2 the paper and ink-ribbon which are provided for receiving the imprint from the characters on the type-wheels 10 are automatically fed forward, the numbers are printed on paper through suitable impression mechanism, and then the type-wheels and the shaft with its wheels and the keys are all released and returned to their normal position, and this is done in the form shown in the drawings automatically. All of these operations are performed by a rotation of crank 2 in one direction only and in one complete revolution of the crank.

At the close of its revolution we preferably automatically bring crank 2 to a full stop to prevent a second operation of the machine too quickly and before the parts have been enabled to return to their normal positions, as will be presently described. We also provide suitable mechanism for resetting the total-adding wheels so as to bring those wheels each to zero. This resetting mechanism consists of a series of resetting-wheels 27, which are so arranged as normally to be disconnected from the total-adding wheels and their driving mechanism, as shown in Fig. 16. When it is desired to reset the total-adding wheels, the crank 224 is turned, which rotates shaft 28, causing cam 29 to force downward rocking piece 30, pivoted at 31. Rocking piece 30 forms the bearing of shaft 32, upon which the transferring-wheels 23 are mounted. The downward movement of rocking piece 30 thus separates transferring-wheels 23 from wheels 24, thus disconnecting the total-adding wheels from the driving mechanism of the machine. By means of pin 34 at the upper end of rocking piece 30 working between the fingers 35 of rocking piece 37 the latter rocking piece is rocked upon its bearings 36. Rocking piece 37 carries shaft 38, upon which resetting-wheels 27 are mounted. The same motion of cam 29 that depresses rocking piece 30 and separates transferring-wheels 24 and 23 also brings resetting-wheels 27 and transferring-wheels 24 into engagement with each other. By turning crank 225, secured to shaft 38, the resetting-wheels are moved and transmit motion to the total-adding wheels 26, moving them back each to zero.

We will now proceed to describe more in detail each of the parts and operations referred to above.

*Locking devices for keys and their releasing mechanism.*—These are more particularly shown in Figs. 1, 2, 3, 14, 15, and 16. Each series of keys is provided with a locking-plate 3 to lock each key that is operated in its set position and to prevent the actuation of more than one key of the series at a time. As shown, plate 3 is adapted to slide in the line of the series of keys, pins 48, projecting from the framework into openings 58 of the plate, permitting this movement. Each sliding plate is provided with a series of inclined slots 57, one for each key, the mouth of each slot registering normally with a pin or projection 47, forming part of the stem of the key. When a key is depressed, pin 47 enters its slot 57 and presses the sliding plate to the left, as viewed in Fig. 2. A spring tends to hold the sliding plate in its former or right-hand position, as viewed in Fig. 2, and to return it to that position when the sliding plate is released, as hereinafter described. When a key has been depressed to its full extent, sliding plate 3 has been pushed to the left and is locked in that position by the following-described means: Loosely secured to the left or lower end of sliding plate 3, by means of a pin and fingers 59, is a rocking lever 60, pivoted at 61 and carrying at its outer end a pin 62. The latter pin is adapted to engage with a spring-pressed catch 49, pivoted at 50. This catch has a cut-away portion 51 at its upper end and is pressed by spring 52 against pin 62 of lever 60. When sliding plate 3 is pushed to the left by the depression of the key, pin 62 is moved into the cut-away part 51 of catch 49 and is held in that position, thus locking plate 3 and its depressed key in their set position. As shown, one lever 60 and one catch 49 are provided for each sliding plate 3. Whenever a sliding plate 3 is moved to the left, it not only locks the key that has been depressed in its set position, but also prevents any other key of the same series from being depressed until the first key has been returned to its normal position, as pin 47 of any other key does not now register with the corresponding slot 57, but will strike the upper surface of plate 3.

All of the sliding plates and keys are released after the machine has completed its work toward the end of the revolution of the crank 2, and this is done, preferably, by one common releasing device and automatically. This releasing is effected through a releasing-shaft 53, provided with a toe 54, running across the machine and engaging with the toe 55 of each catch 49, freeing the catch and permitting pin 62 of lever 60 to escape from the cut-away portion 51. The springs on the sliding plates return them to their proper positions, and the springs 56 on the keys return them to their proper positions.

Crank-releasing shaft 53 is operated toward the close of the revolution of crank 2 by the following means: On the shaft of the crank is mounted a disk (see Fig. 15) which carries a cam 216. Toward one end of shaft 53 is fastened an arm 214, which normally bears against the disk, so as to engage with cam 216. Cam 216 engages with arm 214 toward the close of the revolution of crank 2, slightly rocking shaft 53 and causing the freeing of the locking-plates and keys, as above described.

After a number has been brought upon the printing or adding line and has been printed it is sometimes desired to reprint the same number without the necessity of setting up again the same keys. For this purpose we have provided means for throwing out of operative position the above-described means for releasing the sliding plates and keys. For this purpose we arrange shaft 53 so that it can have a slight longitudinal movement in the direction of its length sufficient to cause arm 214 to be moved out of the path of cam 216. To accomplish this, we use the right-hand zero-key, (marked 211 in Fig. 1,) which is not needed for other purposes, and place upon its shaft an inclined surface 212. (See Figs. 14 and 15.) When the key is depressed, it engages with the side of an arm 213 upon shaft 53 and presses the shaft and arm 214 slightly to the right, as viewed in Fig. 14. Accordingly when crank 2 is turned cam 216 will not strike arm 214, and the keys will remain in said set position. When crank 2 is operated a second time, the same number will be printed, and so on until key 211 is permitted to return to its normal position, which it will do through its spring when the key is released. It is also desirable at times to be able to return to its original position any key or keys that have been depressed without turning the crank or printing or adding. For this purpose we provide the following means: The left-hand zero-key (marked 225 on Fig. 1) being of no other use is employed for this purpose. It is so arranged that its stem will strike another arm 226, projecting from shaft 53, and will rock that shaft sufficiently to cause catches 49 to release lever 60 and the sliding plates, permitting the keys to return to their normal position. By these means any and all keys that have been set in position may be restored to their normal positions at the will of the operator without operating the machine.

*The crank, main driving-shaft, and its wheels.*—These are especially illustrated in Figs. 1, 2, 3, 4, 5, 6, and 16. Our device, as shown, is provided with a main driving-shaft adapted to be rotated by crank 2 and imparts reciprocating motion to one or more wheels connected therewith to bring the desired characters upon the printing, reading, or adding line. The main driving-shaft 4 is preferably made in two separate and distinct parts—one part, 67, connected to the crank 2 and adapted with it to rotate in one direction only, and another part, 71, adapted to rock or oscillate. These two parts of the shaft are connected together by a detachable lock which is adapted to lock the two parts of the shaft together to move the rocking part of the shaft in one direction as the crank is rotated and to unlock them to permit the rock-shaft to be returned to its normal position, as by means of spring 72, secured at one end to the framework of the machine and at the other end to rock-shaft 72. As shown, the detachable lock and its connections are as follows: Rigidly mounted upon shaft 67 is a disk 69, and similarly mounted upon shaft 72 is a disk 70. Pivoted to disk 69 at point 77 is a locking-piece 78, provided at one end with a lug 73, projecting sidewise toward and over disk 70 and adapted normally to lie against shoulder 74 of disk 70. In this normal position of the parts motion is transmitted from shaft 67 and disk 69 through locking-piece 78, lug 73, and shoulder 74 to disk 70 and shaft 71 and to the wheels mounted thereon, to be presently described. When crank 2 has nearly made a full revolution and the printing or adding has been completed, the end 75 of locking-piece 78 passes under roller 76, secured to the framework of the machine, and is pressed downward, lifting lug 73 out of engagement with shoulder 74, as illustrated in Fig. 5. Spring 72 immediately returns shaft 71 to its original position.

By means of the detachable lock and the above-described arrangement of the driving-shaft made in two parts crank 2 can be rotated in the same direction at all times, and the reciprocating or rocking motion necessary to operate the type-segments can still be obtained.

Backward rotation of shaft 67 is prevented by means of a spring-pressed pawl 86, taking into the teeth of ratchet-wheel 80, mounted on shaft 67. (See Fig. 6.)

In order to prevent the too rapid actuation of the machine, we prefer to bring crank 2 to a full stop at the end of each revolution. Our preferred device for accomplishing this purpose consists of a movable stop 79, mounted in the framework of the machine and normally held by spring 85 up out of engagement with the projection 81 on the side of wheel 80. (See Fig. 6.) Toward the close of the revolution of crank 2 and disk 80 movable stop 79 is automatically moved into its operative position, or the position where its face 82 will strike projection 81. This is accomplished by means of another projection 83 on disk 80. Projection 83 is so placed that it will strike the rear end of movable stop 79 just in time to throw down the forward end or face 82 into the way of projection 81, so as to be struck by the latter projection. This will bring the crank to a stop and cause it to slightly rebound, when spring 80 will pull the movable stop up out of operative position, whereupon crank 2 can be rotated again. If the rebound is not sufficient for this purpose, a slight backward movement of the crank 2 will suffice to release the movable stop.

Upon part 71 of the main driving-shaft are mounted a number of wheels, one for each series of keys, to transfer the motion of the shaft to the type-wheels to bring the proper characters upon the printing, reading, or adding line. These wheels, which are designated 5 in the drawings, are composed of two parts—one part, 6, rigidly connected to the shaft and the other part, 7, mounted loosely thereon. We provide a detachable lock, which is adapted to connect the two parts rigidly together to cause the fast part to rotate the loose part a certain distance, whereupon the lock is operated to disconnect them to permit the loose part to stop while the fast part rotates onward with the shaft. As shown, this detachable lock consists of a swinging piece 64, pivoted to loose part 7 at 65 and normally held by spring 66 in the position shown in Figs. 2 and 16. Swinging piece 64 has a projecting knob adapted to strike the lower part of the stem of any key in its series when depressed, and it has also a lug 64', (see Fig. 24,) adapted normally to lie over or in front of a shoulder 71' on the fast part 6 of the wheel. In the former position of the parts lug 64' is in contact with shoulder 71', and when the main shaft is rotated the shoulder through lug 64' pushes or rotates the loose part 7 of the wheel until its knob strikes the inner end of a depressed key. This tilts piece 64, throwing the lug 64' out of engagement with shoulder 71', whereupon loose part 7 of the wheel is held with its knob against the stem of the depressed key, while the fast part 6 of the wheel is rotated by the shaft and the crank farther onward. The distance that the part 7 of the wheel rotates is dependent upon which one of the series of keys is depressed, and through the teeth 8 of its segment meshing with teeth 9 on type-wheel 10 the latter is rotated a similar distance, bringing that one of type 11 upon the printing-line which corresponds with the key that has been depressed.

By the above means a plurality of wheels can be arranged upon a shaft and all be rotated by the same shaft and by the same movement; but the said wheels can be sufficiently independent of one another to allow each wheel to travel its own distance irrespective of that traveled by the other wheels, enabling each wheel to bring its proper number upon the printing-line.

In order to insure that each loose part 7 of the wheel shall be held in its set position after its knob 64 strikes the stem of a depressed key, we preferably connect the fast and loose parts of each wheel together by means of a spring 6', which, as shown, is arranged between the two parts of the wheel and is secured to both.

When the part 71 of the main driving-shaft is released and returns to its original position under the stress of spring 72, a shoulder 227, preferably provided with a rubber buffer, of fast part 6 of each wheel strikes against a shoulder 228 of the loose part 7 of the same wheel, carrying the loose part back to its original position.

In order to equalize the pressure upon the crank and shaft throughout their rotation, we preferably arrange the wheels 5 and their segments, bearing teeth 8, in echelon upon shaft 4—as shown, for example, in Fig. 2. By these means the work of rotating the different parts is distributed equally throughout the rotation of the crank and its shaft.

*The type-wheels, their locking-pawls, and their releasing mechanism.*—After the type-wheels 10 have been moved into set position it is necessary to hold them there during the printing operation. Any suitable mechanism may be employed for this purpose. The means we prefer to employ are shown in Figs. 2, 3, 4, and 16 of the drawings and consist of a series of pawls 14, one for each type-wheel 10, loosely mounted upon a bar 15 and pressed by a spring normally in engagement with the ratchet-teeth 227 of type-wheel 10 and holding those wheels in any position into which they may be moved. We preferably arrange means for releasing all of these pawls at the same time to permit all of the type-wheels to return to their original position at once. As shown, this is accomplished by means of an arm 229, rigidly secured to shaft 15 and having a toe at its lower end. A cam 230 upon shaft 71 toward the close of the rotation of the shaft lifts the toe of arm 229 and rocks shaft 15 slightly. Each pawl 14 is mounted like a sleeve upon shaft 15, but has a part cut away on one side of pin 15ª, which projects from shaft 15. The part cut away is to enable each pawl 14 to move slightly to the left as viewed in Fig. 2 to permit wheel 10 to rotate. When arm 229 and shaft 15 are rocked, however, pin 15ª also rocks the sleeve of each pawl 14, lifting it wholly out of engagement with ratchet-teeth 227, permitting type-wheels 10 to be rotated backward by teeth of wheel 7 as they return to their normal position.

By the above means each pawl is free to move against the pressure of its spring independently of the other pawls sufficiently to permit its type-wheel to rotate one way, and all of the pawls are positively moved in the same direction to unlock the type-wheels from the pawls to permit them to rotate backward to their original positions, and all of the pawls are operated at once and automatically.

In order to permit the use of keys of sufficient size for practical use and the arrangement of wheels upon the main shaft with fast and loose parts, which necessarily requires considerable room, and yet to have the type 11 on the type-wheels and the type on the total-adding wheels close together to print the numbers compactly and close together on the recording material, we have found it desirable to nest the bodies of the type-wheels in the manner shown in Fig. 4. As there shown the type 11 are arranged close together, while the bodies of the type-wheels 10 are spread apart and are somewhat nested in form to permit the gears 9 to be wide enough apart to register with the gears 8 of the wheel 7.

*Printing mechanism.*—After the type-wheels have been moved into set position and the totals have been added and appear upon the printing-line in the type of the total-adding wheels the machine is adapted to print the type of the type-wheels upon any suitable paper or record-surface and also, if desired, to print the totals of the total-adding wheels. While any suitable mechanism may be employed for this purpose, we will now proceed to describe that shown in the drawings. These are especially illustrated in Figs. 1, 2, 3, 4, 6, and 17. The impression-surface, as shown, consists of a roller 16, mounted in a swinging support carried upon a sliding carriage, the latter movable upon a frame pivoted at one end and having means for swinging down the other end to produce printing pressure. The frame consists of two cross-bars 101 and 106, the former being stationary and rigidly fixed in suitable supports of the framework of the machine and the latter being carried in the bearing-sleeves 125, one at each side of the machine, each sleeve supported by a rod 126, adapted to move vertically in suitable bearings and connected to arm 97, the latter pivotally connected to arm 96. Arms 96 are secured at each side of the machine to a shaft 91. Secured to said shaft at one side of the machine is an arm 90, carrying a roller 89, fitting into cam-groove 88 of cam-wheel 80, which latter rotates with the part 67 of the main shaft, as already described. As crank 2 and shaft 67 are rotated a rocking movement is given to shaft 91 and at the proper time in the revolution of the crank-bar 106 is pulled downward, forcing impression-roller 16 downward against ink-ribbon 12 and type 11 of type-wheels 10, thus printing upon any strip of paper or other suitable record-surface which may be interposed between roller 16 and ink-ribbon 12. For convenience we arrange straps 119, suitably secured, running down beneath roller 16 to act as guides for the paper which is inserted beneath the roller. Rod 126 is composed in the usual way of a double-threaded portion 127 and two nuts for adjusting its length. In order to permit the forward part of the frame to swing downward, the side pieces 103 and 104 are secured by collars 102 to rod 101. These collars fit loosely upon rod 101 and form a pivotal connection at that end for the frame. The frame is thus pivoted at one end and is provided with means secured to the other end connected with the driving mechanism of the machine for swinging the frame to produce a printing pressure.

The frame is provided at its forward end with a cross-piece 110, and this cross-piece is connected with rod 106 by sleeves 107, which encircle the rod and are loose thereon. The main part of the frame is in this way made movable laterally, so as to bring different parts of the printing-roller opposite to the printing-type for the purpose of enabling the numbers or characters to be printed in different columns upon the record-sheet. In the device shown in the drawings arrangement is made for three separate columns, and a pointer 109, mounted upon bar 110, and marks 108 on the rod 106 show when the frame is in proper position to print the different columns.

Preferably means are provided for rotating printing-roller 16 in order to feed forward the record-strip. For this purpose I place a gear-wheel 124 upon the shaft of the printing-roller and cause it to mesh with a gear-wheel 218 upon shaft 223. This shaft is driven through a gear-wheel 219, fixed upon it, and a pawl 220, secured to a vertically-movable plate 157. The mechanism for driving this consists, as shown, of the following devices: Mounted upon shaft 67 is a cam 68. The toe of arm 94, secured to a sleeve 92, moving freely upon shaft 91, engages with cam 68. Secured to sleeve 92 at one side of the machine is an arm 150. Pivotally secured at the other end of arm 150 is a rod 154, carrying a block 155 and a pin 156, secured to the block and to plate 157. As cam 68 rotates arm 150 is slowly depressed and then is quickly raised, thus rotating shaft 223 and roller 16 and feeding forward the record-strip for the next impression. This feeding of the paper takes place just before the printing operation.

Rod 154 and arm 150 are adjustably connected by block 152, into which rod 154 is screwed, block 152 being capable of being moved along slot 151 and being fastened in the usual manner at any point along that slot. Spring 153 tends to hold arm 150 upward as viewed in Fig. 17. By arranging three gears 218 at the proper points on shaft 223 gear 124 makes connection with that shaft and is driven thereby at any one of the three lateral positions of roller 16. Of course any other number of columns could be provided for by arranging the necessary number of gears on shaft 223.

Thumb-screw 123 enables the operator to turn roller 16 and feed the paper at will.

In order to be enabled to print the totals upon the record-sheet at any time desired, we preferably provide an inking-ribbon 226, mounted upon spools 227 over the total-printing wheels along the printing-line, and we arrange the printing-roller upon a carriage, which is free to move along the frame at right angles to the axis of the printing-roller.

The carriage in question is composed of side pieces 120, connected by cross-pieces 114 and 115. Sleeves 105, connected to cross-pieces 120 and loosely encircling bars 103 and 104, support the carriage upon the frame and permit it to move at right angles to the axis of the printing-roller. This is to enable the printing-roller to print either on the printing-line over type-wheels 10 or to print the totals over the printing-line of the total-adding wheels.

We preferably mount the impression-roller so that it can be swung upward and for this purpose provide a swinging support upon the carriage. As shown, this is constructed by means of side bars 121, which are pivotally secured to cross-piece 115. The swinging support is provided with cross-pieces 117 and 118. Springs 116, secured to cross-pieces 115 and 117, tend to swing the forward or left-hand end of the swinging support upward. To counteract the spring, we provide a locking device at the forward end to connect the swinging support rigidly to the carriage. The particular device shown for this purpose consists of pins 116$^a$, secured to side pieces 121, which are adapted when the frame is pressed downward to pass through an opening 115 in sleeve 111, surrounding cross-piece 114 and taking into a groove 113 between cross-piece 114 and sleeve 111, as shown in Figs. 26 and 27. After the pins 116$^a$ have been depressed through openings 115 sleeve 111 is slightly rotated by means of thumb-piece 112 into the position shown in Fig. 27. This locks the pins and the swinging frame rigidly to the carriage. When sleeve 111 is rotated the other way, so that opening 115 registers with pins 116$^a$, the springs 116 force the free end of the swinging support away from the sliding carriage. Access may then be easily and conveniently had to the printed record.

*The adding-wheels and their carrying devices.*—These are particularly shown and illustrated in Figs. 1, 2, 7 to 13 and 16. Motion is transmitted from the type-wheels 10 to the total-adding wheels 26 by means of toothed segments 19 on type-wheels 10 by a series of rocking segments 20 and transferring-wheels 21, 23, and 24. Each segment 19 meshes with the teeth of the corresponding segment 20, loosely mounted on shaft 31, each segment being held in normal position by spring 147, suitably secured to the framework of the machine. As shown in Fig. 2, spring 147 is connected to bell-crank 148 and the latter by spring 149 to rod 150. This arrangement is for the purpose of producing a more even pull of the spring and to permit fine adjustment of it. Each segment has also a pawl 146, held by a spring 145 in engagement with the teeth of a ratchet-wheel 22, forming part of wheel 21, also loosely mounted on shaft 31. Each wheel 21 is provided with a set of gear-teeth which mesh with the gear-teeth 23' of a corresponding wheel 23, loosely mounted on shaft 32. As many wheels 21 are provided as there are type-wheels 10, and each of these wheels 21 has a corresponding wheel 23. Two parallel sets of wheels are thus provided—one loosely mounted on shaft 31 and the other on shaft 32. Each wheel of the second set that is thus mounted on shaft 32, excepting the one representing the highest order of digits, is provided with suitable mechanism for meshing into the ratchet-teeth of a wheel in the first set—that is, in the set mounted on shaft 31, representing the next higher order of digits—for the purpose of carrying to that higher order. One or any number of carrying-pawls may be arranged on each wheel 23. As shown, we prefer four pawls 141, each loosely mounted upon pin 142, with a stop 143. These pawls are of course arranged at such a distance apart on the wheel 123 that they will feed wheel 121 of the next higher order of digits one tooth forward for each ten teeth moved on lower wheel 21. Each wheel 21 on shaft 31 is similarly provided with a set of gear-teeth to mesh into the gear-teeth 23' of its wheel 23. The pawl 41 is held by spring 43 in engagement with the ratchet-teeth of each wheel 22 and prevents backward rotation of such wheel. Gear-teeth 23' mesh into the gear 139 of each wheel 24, and this motion is transmitted to each total-adding wheel 26 through its gear 25. By these means the numbers set up in type 11 on the printing-line are added, the total appearing on the adding or printing line of the total-adding wheels 26. By using two parallel sets of wheels the carrying is done easily and accurately with little friction and with very simple mechanism, and the mechanism is not easily thrown out of accurate working order.

*Devices for resetting total-adding wheels.*—These are illustrated especially in Figs. 1, 2, 13, and 16. For the purpose of enabling the total-adding wheels to be reset easily and with little friction and to avoid the necessity of driving the resetting devices during the ordinary operation of the machine we provide means for throwing the resetting and total-adding wheels into and out of connection with each other and also means for disconnecting the total-adding wheels and the driving mechanism of the machine. We are thus enabled to reset the adding-wheels without moving backward all of the driving parts of the machine, and we are enabled to operate the machine in its ordinary way without moving backward the resetting devices. We will now proceed to describe the preferred form of these resetting devices as the same are shown in the drawings.

We provide a series of resetting-wheels 27, one for each total-adding wheel. These are frictionally mounted upon shaft 38, supported in a swinging frame 37, pivotally mounted upon shaft 36, secured to the framework of the machine. By swinging frame 37 upon its shaft resetting-wheels 27 may be caused to engage with wheels 24 or to be separated therefrom. Ordinarily, as during the regular printing and adding operations of the machine, they are separated, as shown in Fig. 16. When it is desired to reset the total-adding wheels, wheels 27 are thrown into engagement with wheels 24, and shaft 38 is rotated by means of crank 225, secured to its end to move the total-adding wheels back to zero.

At the same time that wheels 27 and 24 are brought into engagement transferring-wheels 23 are separated from wheels 24, and when wheels 27 are separated from wheels 24 transferring-wheels 23 are connected with the latter. To accomplish this, we mount shaft 32, which carries wheel 23, in two rocking frames 30, each frame pivoted to the framework of the machine on shaft 31 and normally held upward by spring 46. Each rocking frame 30 carries at its upper end a pin 34, which works between fingers of piece 37, as shown in Fig. 16. A cam 29 is mounted upon a shaft 28, at the outer end of which is secured the handle 224. By turning handle 224 the cam throws rocking frames 30 downward, separating wheels 23 and 24 and connecting resetting-wheels 27 with the latter. By now turning handle 225 in the proper direction the total-adding wheels are reset at their original or zero positions. By turning crank 224 back to its original position connection is broken between wheels 27 and 24 and made between wheels 23 and 24, and the machine is in condition for further operation.

Resetting-wheels 27 are frictionally mounted on shaft 38, and between adjoining wheels are placed circular friction-plates 137. By means of this frictional arrangement one wheel can stop before another when it has reset its wheel at zero, at the same time permitting the other resetting-wheels to continue their resetting work and yet have all of the wheels driven from one common source of power. By means of end plates 39 and screws 138 the frictional pressure upon wheels 27 can be regulated. For this purpose frictional plates 137 are frictionally mounted upon shaft 38.

In order to furnish a stop for each total-adding wheel to prevent its rotation back of zero and also to cause the cipher on each wheel to lie below the printing-surface when it is not necessary to have it printed, we provide a stop to prevent such backward rotation, and we make the cipher or zero type of each total-adding wheel movable and provide means for raising it to and holding it upon the printing or reading level and for depressing it below that level when it is desired. In the form shown we accomplish this by the following-described devices: Between the different total-adding wheels 26 we arrange collars 128, adapted to fit over the shaft of the total-adding wheels and secured to two adjoining shafts 131, as shown in Fig. 9. Each collar is provided with a cam. As shown, it takes the form of a cam-groove 133 in the side of collar 128. 129 is the movable type carrying a cipher, and 136 represents the top of the other digits. Movable type 129 is fitted into a space 135 in each total-adding wheel 130, and when the total-adding wheels and the collars are arranged as shown in Fig. 9 each type 129 is located in its space 135, but is free to move up and down or radially in that space and is guided in that movement by a pin 130, projecting from the side of the movable type and adapted to take into cam-groove 133. This cam-groove is so arranged that during the greater part of its length it holds type 129 outward or upward, so that it is on the printing-level or the same level as the other type upon the wheel. At a point, however, just to the right of the printing-line, as shown in Fig. 11, this cam-groove drops downward and is cut backward or to the left at point 132 until it comes under the exact printing-line. This leaves a slightly overhanging portion of the under or inner surface of the cam-groove, which overhangs the cut-away part 132. In operation cam-groove and pin 130 hold type 129 outward and upward until it reaches the printing-line and a short distance beyond, when the type 129 falls downward below the printing-level. In the regular operation of the machine, however, it is soon raised again to the printing-level. If, however, the total-adding wheels are moved backward, as in the resetting operation, pin 130 will be carried into the recess or cut-away portion 132, thus bringing its total-adding wheel to a stop and preventing further backward rotation. At this point the zero-type 129 is below the printing-level, though in a vertical plane with the printing-line. This is the normal position of all the ciphers when the total-adding wheels have been reset. Whenever any one of the total-adding wheels is moved to the right in the regular operation of the machine, the cipher is raised to the printing-level and is maintained there at all times thereafter whenever that type is on the printing-line and is thus always thereafter printed; but until its total-adding wheel has been moved the cipher is never printed. In this way we are able to prevent the unnecessary printing of ciphers to the left of any one or more numbers that are printed on the machine. At the same time we afford a convenient and simple stop for bringing the type-wheels into their original position when reset.

Cam-groove 133 is shown as bringing type 129 up to the printing-level immediately after the commencement of movement of the total-adding wheel. This is not essential, however, as the only requisite in this connection is that the type should be brought to the printing-level before it reaches the printing-line.

*Mechanism for feeding the ink-ribbon.*— The mechanism for feeding the ink-ribbon 12 is shown in Figs. 4, 17 to 19, and 20 to 23. The ink-ribbon is mounted upon two spools 160 and 207 and is arranged to be fed forward automatically as the machine operates, and means are provided for automatically reversing the direction of feed. Spool 160 is frictionally mounted upon shaft 162, the frictional engagement being assisted by spring 161, which presses spool 160 against the inner enlarged part of shaft 162, as clearly shown in Fig. 19. Mounted upon shaft 162 is a gear 160ª. 161ª is another gear arranged alongside of gear 160ª, though not connected therewith. Gear 161ª when rotated drives a shaft 188, mounted in suitable bearings. Connected to the end of this shaft by collar 189 and adjusting-screws is a flexible shaft 187 for transmitting the rotation of shaft 188 to a shaft 193 on the opposite side of the machine. Flexible shaft 187 and shaft 193 are similarly connected by collar 192. Integral with the shaft 193 is an arm 198, carrying a pawl 196, which at times is adapted to mesh with the teeth of gear-wheel 202, which is mounted upon the same sleeve 208 to which spool 207 is rigidly secured.

Motion is imparted to gear-wheels $160^a$ and 161 by means of a broad-toothed pawl $165^a$, forming the right-hand end of pawl 165 to rotate spool 160 and to wind ink-ribbon 12 up on spool 160. The means for actuating this pawl will be presently described. Pawl 165 has at its other end a narrow-toothed pawl $165^b$, which engages only with ratchet-wheel 161. When pawl $165^a$ engages ratchet-wheels $160^a$ and 161, ink-ribbon 12 is fed toward the bottom, as viewed in Fig. 19, and shaft 187 is rotated in one direction. In this direction arm 198 and pawl 196 move in the direction of the arrow shown in Fig. 22. While moving in this way, pawl 196 does not engage with ratchet 202, and spool 207 is simply frictionally held and allows ribbon 12 to be unwound from it.

When pawl $165^b$ is in engagement with gear 161, shafts 187 and 193 are driven in the reverse direction opposite that of the arrow shown in Fig. 22.

197 is a pin which projects from the side of pawl 196 into grooves 199 and 200 in the disk 195.

201 and $201^a$ are two switches controlling the movement of pin 197 in grooves. When pawl 196 moves in the direction of the arrow, the pin keeps it in the outer groove 199 all the time and the pawl makes no engagement with the teeth of gear-wheel 202. This is the condition when double-faced pawl $165^a$ is in engagement with both gear-wheels $160^a$ and 161. In this position of the parts ink-ribbon 12 can be readily unwound from spool 207; but when pawl $165^b$ engages with gear 161 and reverses the direction of rotation of shafts 187 and 193 pawl 196 is thrown by switch 201 into groove 200 and picks up the teeth of wheel 202 and rotates it. This positively rotates spool 207 in the opposite direction, winding upon it the ink-ribbon. In this position of the parts spool 160 is held frictionally only and permits the ink-ribbon to be unwound from it.

Pawl 165 is actuated through plate 157, which, as previously described, is pushed upward suddenly at each revolution of crank-shaft 2 and is then depressed.

158 is a pin which projects from the back of plate 157. It carries a roller which plays in a slot in a swinging piece 151, mounted loosely upon shaft 190. As pin 158 rises and falls it causes plate 151 to swing from side to side. Upon this plate is mounted pawl 165. At the lower end of the plate is a pin 151', arranged in a slot, as shown in Figs. 20 and 21. A spring 168, secured to the back of frame 151, normally pulls this pin upward and causes it to engage with one of two inclined faces forming the lower edge of pawl 165. This pin tends to hold pawl 165 tilted at an angle, either one side or the other, to gears $160^a$ and 161, as shown in full and dotted lines in Fig. 20. When pawl 165 is tilted in one direction, broad-nosed pawl $165^a$ engages with pawls $160^a$ and 161, as shown by the full lines in Fig. 20. When pawl 165 is tilted the other way, as shown by dotted lines in Fig. 20, pawl $165^b$ engages with gear 161. Thus the direction of feed of the ink-ribbon is dependent upon which side pin 151' is in reference to the lower end of pawl 165. The position of these parts is automatically shifted from one side to the other by the following-described mechanism: 190 is a screw-thread cut upon shaft 188, and with this worm meshes a worm-gear cut in the edges of segment 180, pivoted at 181 in the framework of the machine. The worm-segment 180 carries at each end a stud 179. 170 is a sliding plate mounted in suitable bearings 173 and adapted to be struck by studs 179, throwing it first one way and then the other as the segment moves one way or the other. The studs strike the pin 175, projecting sidewise from an arm 174, forming part of plate 170. In order to assist the sidewise motion of plate 170 and to make it sudden toward the end of the movement, we arrange an arm 177, pivoted in the framework of the machine and carrying at its right end, as shown in Fig. 17, a roller 178, adapted to engage with the inclined surfaces 176, forming the upper part of arm 174. A strong spring 187 pulls arm 177 downward. As stud 179 forces arm 174, and with it the plate, one way, roller 178 rises on the inclined surface 176, and when it has passed the topmost point the downward pressure of spring 187 tends to throw plate 170 over in the same direction suddenly. 185 is another sliding plate suitably mounted in the machine and carrying a bent finger 186, as shown in Fig. 18. Pin 175 projects into the bend of this finger, and as arm 174 is moved one way or the other it thereby moves plate 185 one way or the other through the contact of pin 175 with the wall of bent finger 186. Two pawls 182 and 183 have their rear ends projecting through an opening in plate 185, as clearly shown in Figs. 18 and 20. The cam-surface in the bottom of this opening raises and lowers the rear ends of these pawls, thus throwing the pawls into engagement or out of engagement with gear-wheels $160^a$ and 161. Neither of these pawls is in engagement with the corresponding gear-wheel, while pawl $165^a$ is in engagement with these wheels; but when the ink-ribbon has been wound upon spool 160 and it is necessary to reverse the direction of the feed segment 180 has been moved to its extreme left position, carrying with it the plate 185. This releases both pawls 182 and 183, and they engage their respective wheels $160^a$ and 161. On the next downward movement of pin 158 pawl $165^a$ cannot feed forward these gear-wheels, as they are both locked, and as swinging plate 151 swings over pin 151' is forced downward, as it is the only part of the mechanism that will yield, and thereupon pawl 165 will slip to the other side of pin 151', throwing out pawl 165ª and throwing in pawl 165ᵇ. Thus the feed is automatic at this point. Segment 180 is then fed in the other direction, and when it arrives at the extreme right-hand position, viewed as shown in Fig. 17, both pawls 182 and 183 are thrown out of engagement with wheels 160ª and 161, and at the same time a pin 172, projecting from a pendent arm 171, forming part of plate 170, has been moved into the path of a pin 167 on pawl 165, and at the next swing of plate 151 pin 172 and pin 167 come into engagement with each other again, forcing down pin 151' and throwing it to the other side of the lower inclined faces of pawl 165. This throws out pawl 165ᵇ and throws in pawl 165ª, thus again automatically changing the direction of feed of the ink-ribbon.

Arms 203 and 204, with their springs 206 and 205, are connected, respectively, with switches 201ª and 201 for the purpose of holding them in their normal positions.

Pawls 182 and 183 are provided with springs, as shown, for normally forcing them into engagement with the gear-wheels except when positively withheld from engagement, as above described.

Many changes may of course be made in the devices shown in the drawings and described herein without departing from our invention, the essentials of which are set forth in the claims at the end of this specification.

What we claim as new, and desire to secure by Letters Patent, is—

1. A shaft for imparting reciprocating motion to a plurality of wheels connected therewith, consisting of two parts, one part provided with means for rotating it and with means for preventing backward rotation, and the other part of the shaft, connected with the wheels and adapted to rock, and a detachable lock adapted to lock the two parts of the shaft together to impart motion from the first part of the shaft to the second part to rock the latter in one direction, means for automatically unlocking the lock, and means for rocking the second part of the shaft back to its original position when the lock is removed, a plurality of wheels mounted upon the rocking part of the shaft, each wheel composed of two parts, one rigidly connected to the shaft and the other loose thereon, a detachable lock for each wheel adapted to connect the two parts of the wheel together to rotate the loose part or to disconnect them to permit the loose part to stop at any desired point without interfering with the continued rotation of the shaft, and a series of stops for each wheel arranged so as to be capable of being projected at different points into the path of the loose part of the wheel, and type-bearing mechanism connected with the loose part of each wheel, a bank of keys composed of a plurality of series, one series for each wheel, each key controlling a stop and the keys of the same series adapted to project their stops at different points into the path of the loose part of their corresponding wheel, devices for locking the keys and their type-bearing mechanism, in their set positions, and means for automatically returning the parts to their original positions, whereby by the actuation of the proper keys any desired type may be brought upon the printing or adding line by each wheel without interference with the continued rotation of the shaft, or with the operation of the other wheel or wheels on the shaft, and will be held there until after the printing has been finished and the parts will then be released and returned to their original positions.

2. A shaft for imparting reciprocating motion to a plurality of wheels connected therewith, consisting of two parts, one provided with means for rotating it and with means for preventing backward rotation, and the other part of the shaft connected with the wheels and adapted to rock, and a detachable lock adapted to lock the two parts of the shaft together to impart motion from the first part of the shaft to the second part to rock the latter in one direction, means for automatically unlocking the lock, and means for rocking the second part of the shaft back to its original position when the lock is removed, a plurality of wheels mounted upon the rocking part of the shaft, each wheel composed of two parts, one rigidly connected to the shaft and the other loose thereon, a detachable lock for each wheel adapted to connect the two parts of the wheel together to rotate the loose part or to disconnect them to permit the loose part to stop at any desired point without interfering with the continued rotation of the shaft, and a series of stops for each wheel arranged so as to be capable of being projected at different points into the path of the loose part of the wheel, and type-bearing mechanism connected with the loose part of each wheel, a bank of keys composed of a plurality of series, one series for each wheel, each key controlling a stop and the keys of the same series adapted to project their stops at different points into the path of the loose part of their corresponding wheel, adding-wheels, connections between the latter and the said type-bearing mechanisms for adding upon the adding-wheels the numbers set up upon said type-bearing mechanisms, devices for locking the keys and their type-bearing mechanism, in their set positions, and means for automatically returning the parts to their original positions, whereby by the actuation of the proper keys any desired type may be brought upon the printing or adding line by each wheel without interference with the continued rotation of the shaft, or with the operation of the other wheel or wheels on the shaft, and will be held there until after the printing has been finished and the parts will then be released and returned to their original positions, and whereby the numbers set up upon the type-bearing mechanism will be added upon the adding-wheels.

3. A shaft for imparting reciprocating motion to a plurality of wheels connected therewith, consisting of two parts, one provided with means for rotating it and with means for preventing backward rotation, and the other part of the shaft connected with the wheels and adapted to rock, and a detachable lock adapted to lock the two parts of the shaft together to impart motion from the first part of the shaft to the second part to rock the latter in one direction, means for automatically unlocking the lock, and means for rocking the second part of the shaft back to its original position when the lock is removed, a plurality of wheels mounted upon the rocking part of the shaft, each wheel composed of two parts, one rigidly connected to the shaft and the other loose thereon, a detachable lock for each wheel adapted to connect the two parts of the wheel together to rotate the loose part or to disconnect them to permit the loose part to stop at any desired point without interfering with the continued rotation of the shaft, and a series of stops for each wheel arranged so as to be capable of being projected at different points into the path of the loose part of the wheel, and type-bearing mechanism connected with the loose part of each wheel, a bank of keys composed of a plurality of series, one series for each wheel, each key controlling a stop and the keys of the same series adapted to project their stops at different points into the path of the loose part of their corresponding wheel, adding-wheels, connections between the latter and the said type-bearing mechanisms for adding upon the adding-wheels the numbers set up upon said type-bearing mechanisms, resetting-wheels, means for connecting and disconnecting them with the adding-wheels, and means for breaking the connection between the adding-wheels and the type-bearing mechanisms, devices for locking the keys and their type-bearing mechanism, in their set positions, and means for automatically returning the parts to their original positions, whereby by the actuation of the proper keys any desired type may be brought upon the printing or adding line by each wheel without interference with the continued rotation of the shaft, or with the operation of the other wheel or wheels on the shaft, and will be held there until after the printing has been finished and the parts will then be released and returned to their original positions, and whereby the numbers set up upon the type-bearing mechanisms will be added upon the adding-wheels without driving the resetting-wheels and whereby the adding-wheels may be reset without moving the driving mechanism backward.

4. A shaft for imparting motion to one or more wheels connected therewith having a part adapted to rotate in one direction only, another part adapted to rock, and a detachable lock adapted to lock the two parts of the shaft together to rock the latter part of the shaft in one direction and to unlock them to permit it to rock backward, whereby a reciprocating motion may be imparted to the wheel or wheels and the first part of the shaft will rotate in one direction only.

5. A shaft for imparting reciprocating motion to one or more wheels connected therewith consisting of two parts, one part provided with means for rotating it and with means for preventing backward rotation, and the other part of the shaft connected with the wheel or wheels and adapted to rock, and a detachable lock adapted to lock the two parts of the shaft together to impart motion from the first part of the shaft to the second part to rock the latter in one direction and to unlock them, and means for rocking the second part of the shaft back to its original position when the lock is removed, whereby a reciprocating motion may be imparted to the wheel or wheels and the first part of the shaft will rotate in one direction only.

6. A shaft for imparting reciprocating motion to one or more wheels connected therewith consisting of two parts, one part provided with means for rotating it and with means for preventing backward rotation, and the other part of the shaft, connected with the wheel or wheels and adapted to rock, and a detachable lock adapted to lock the two parts of the shaft together to impart motion from the first part of the shaft to the second part to rock the latter in one direction, means for automatically unlocking the lock, and means for rocking the second part of the shaft back to its original position when the lock is removed, whereby a reciprocating motion may be imparted to the wheel or wheels and the first part of the shaft be rotated in but one direction only.

7. A shaft for imparting reciprocating motion to one or more wheels connected therewith consisting of two parts, one part provided with means for rotating it and with means for preventing backward rotation, and the other part of the shaft, connected with the wheel or wheels and adapted to rock, two disks one on each part of the shaft, a shoulder on one disk, a movable lock on the other disk adapted, as the disk rotates, normally to strike the shoulder and to carry the other disk and part of the shaft with it, a projection in the path of the movable lock adapted at the proper time to trip it and disconnect the two disks, and a spring for rocking the second part of the shaft back to its original position when the lock is removed, whereby a reciprocating motion may be imparted to the wheel or wheels and the first part of the shaft be rotated in but one direction only.

8. The combination with a wheel of a movable stop for arresting rotation of the wheel, a projecting part of the wheel adapted to strike the stop when the latter is moved into its operative position, means for normally holding the stop out of operative position and means adapted to be operated by the wheel for automatically moving the stop into operative position to arrest the rotation of the wheel.

9. The combination with a wheel of a movable stop for arresting rotation of the wheel, a projecting part of the wheel adapted to strike the stop when the latter is moved into its operative position, means for normally holding the stop out of operative position, another projection on the wheel adapted at a part of its rotation to engage with the stop to move it into operative position to engage with the first-mentioned projection to arrest the rotation of the wheel.

10. The combination of a movable stop for arresting rotation of the wheel, a projecting part of the wheel adapted to strike the stop when the latter is moved into its operative position, means for normally holding the stop out of operative position, another projection on the wheel adapted at a part of its rotation to engage with the stop to move it into operative position, and so placed and arranged that it will engage with the stop to throw it into operative position just in time to cause the projecting portion of the wheel to strike it and so as to free the stop to permit it to move out of operative position immediately thereafter to prevent blocking the machine.

11. The combination of a wheel connected with the power-shaft of the machine, a pivoted stop for arresting rotation of the wheel, a projecting part of the wheel adapted to strike the stop when the latter is moved into its operative position, a spring for normally holding the stop out of operative position, another projection on the wheel adapted at a part of its rotation to engage with the stop to move it into operative position and placed on the wheel so as to engage with the stop just in time to cause the projecting portion of the wheel to strike it so as to free the stop to permit it to move out of operative position immediately thereafter to prevent blocking the machine.

12. The combination of a wheel mounted upon a shaft and composed of two parts, one rigidly connected to the shaft and the other loose thereon, a detachable lock adapted to connect the two parts together to rotate the loose part or to disconnect them to permit the loose part to stop at any desired point without interfering with the continued rotation of the shaft, and a series of stops arranged so as to be capable of being projected at different points into the path of the loose part of the wheel, and type-bearing mechanism connected with the loose part of the wheel, whereby any desired type may be brought upon the printing or adding line without interference with the continued rotation of the shaft.

13. The combination of a plurality of wheels mounted upon a shaft each wheel composed of two parts, one rigidly connected to the shaft and the other loose thereon, a detachable lock for each wheel adapted to connect the two parts of the wheel together to rotate the loose part or to disconnect them to permit the loose part to stop at any desired point without interfering with the continued rotation of the shaft, and a series of stops for each wheel arranged so as to be capable of being projected at different points into the path of the loose part of the wheel, and type-bearing mechanism connected with the loose part of each wheel, whereby any desired type may be brought upon the printing or adding line by each wheel without interference with the continued rotation of the shaft, or with the operation of the other wheel or wheels on the shaft.

14. The combination of a wheel mounted upon a shaft and composed of two parts, one rigidly connected to the shaft and the other loose thereon, a detachable lock adapted to connect the two parts together to rotate the loose part or to disconnect them to permit the loose part to stop at any desired point without interfering with the continued rotation of the shaft, a spring connecting the fast and loose parts and adapted to be strained as the parts separate, and a series of stops arranged so as to be capable of being projected at different points into the path of the loose part of the wheel, and type-bearing mechanism connected with the loose part of the wheel, whereby any desired type may be brought upon the printing or adding line without interference with the continued rotation of the shaft and will be held there until the fast part of the wheel returns to the loose part.

15. The combination of a plurality of wheels mounted upon a shaft each wheel composed of two parts, one rigidly connected to the shaft and the other loose thereon, a detachable lock for each wheel adapted to connect the two parts of the wheel together to rotate the loose part or to disconnect them to permit the loose part to stop at any desired point without interfering with the continued rotation of the shaft, a spring connecting the fast and loose parts of each wheel and adapted to be strained as the parts separate, a series of stops for each wheel arranged so as to be capable of being projected at different points into the path of the loose part of the wheel, and type-bearing mechanism connected with the loose part of each wheel, whereby any desired type may be brought upon the printing or adding line by each wheel without interference with the continued rotation of the shaft and will be held there until the fast part of each wheel returns to the loose part.

16. The combination of a plurality of wheels mounted upon a shaft each wheel composed of two parts, one rigidly connected to the shaft and the other loose thereon, a detachable lock for each wheel adapted to connect the two parts of the wheel together to rotate the loose part or to disconnect them to permit the loose part to stop at any desired point without interfering with the continued rotation of the shaft, and a series of stops for each wheel arranged so as to be capable of being projected at different points into the path of the loose part of the wheel, and type-bearing mechanism connected with the loose part of each wheel, the connections between the type-bearing mechanism and the loose parts of the wheel being arranged in echelon fashion to equalize the pressure throughout the rotation of the shaft, whereby any desired type may be brought upon the printing or adding line by each wheel without interference with the continued rotation of the shaft, or with the operation of the other wheel or wheels on the shaft.

17. The combination of a plurality of wheels mounted upon a shaft, each wheel composed of two parts, one rigidly connected to the shaft and the other loose thereon, a detachable lock for each wheel adapted to connect the two parts of the wheel together to rotate the loose part or to disconnect them to permit the loose part to stop at any desired point without interfering with the continued rotation of the shaft, and a series of stops for each wheel arranged so as to be capable of being projected at different points into the path of the loose part of the wheel, a series of keys for each wheel arranged to control said stops, and type-bearing mechanism connected with the loose part of each wheel, whereby any desired type may be brought upon the printing or adding line by each wheel without interference with the continued rotation of the shaft, or with the operation of the other wheel or wheels on the shaft.

18. The combination of a wheel mounted upon a shaft and composed of two parts, one rigidly connected to the shaft and the other loose thereon, a detachable lock adapted to connect the two parts together to rotate the loose part or to disconnect them to permit the loose part to stop at any desired point without interfering with the continued rotation of the shaft, a spring connecting the fast and loose parts and adapted to be strained as the parts separate, and a series of stops arranged so as to be capable of being projected at different points into the path of the loose part of the wheel, and type-bearing mechanism connected with the loose part of the wheel, whereby any desired type may be brought upon the printing or adding line without interference with the continued rotation of the shaft and will be held there until the fast part of the wheel returns to the loose part, and a projection upon the fast part of the wheel adapted to strike against the loose part and during return of the former, whereby the loose part will be returned to its original position.

19. The combination of a wheel mounted upon a shaft and composed of two parts, one rigidly connected to the shaft and the other loose thereon, a detachable lock adapted to connect the two parts together to rotate the loose part or to disconnect them to permit the loose part to stop at any desired point without interfering with the continued rotation of the shaft, and a series of stops arranged so as to be capable of being projected at different points into the path of the loose part of the wheel, and type-bearing mechanism connected with the loose part of the wheel, whereby any desired type may be brought upon the printing or adding line without interference with the continued rotation of the shaft, and means for holding the type-bearing mechanism in its set position, and means for releasing it and for returning all the parts to their normal positions.

20. The combination of a plurality of wheels mounted upon a shaft, each wheel composed of two parts, one rigidly connected to the shaft and the other loose thereon, a detachable lock for each wheel adapted to connect the two parts of the wheel together to rotate the loose part or to disconnect them to permit the loose part to stop at any desired point without interfering with the continued rotation of the shaft, and a series of stops for each wheel arranged so as to be capable of being projected at different points into the path of the loose part of the wheel, a type-bearing mechanism connected with the loose part of each wheel, whereby any desired type may be brought upon the printing or adding line by each wheel without interference with the continued rotation of the shaft, or with the operation of the other wheel or wheels on the shaft, and means for holding the type-bearing mechanism in its set position, printing mechanism, and means for releasing and returning the parts to their normal positions.

21. The combination of a series of keys for bringing type representing different characters upon a printing-line, means for locking the keys and type in their set position until after the printing operation, means for releasing the locking means after the printing has been done, and a device, adapted to be operated by one of the keys after the setting of the keys but before the printing operation, for throwing the releasing means out of operative position, whereby the machine may be operated more than once for reprinting from the same type, with the same key or keys remaining in the same set position.

22. The combination of total-adding wheels, including a set of driving and transferring wheels, resetting-wheels and a shifting frame with which the driving and transferring wheels and resetting-wheels are connected, all so arranged that, when said frame is shifted one way, the total-adding wheels will be connected with the driving-wheels and will be disconnected from the resetting-wheels and, when the frame is shifted the other way, the total-adding wheels will be connected with the resetting-wheels and will be disconnected from the driving-wheels.

23. In a type-wheel in an adding-machine the combination of a type movable radially of the wheel, a pin projecting from the wheel, a cam-groove with which the pin engages to hold the type upon the printing or reading level, and having a part cut away beyond the printing or reading line in a downward and backward direction to cause the type to be depressed after passing the said line and to act as a stop to the type and wheel when the latter is rotated backward, and resetting-wheels for rotating the type-wheels backward, whereby the type will not be upon the printing or reading level when the wheel is reset or the type turned backward to the said printing or reading line, but will be upon that level at the printing or reading line at all times thereafter during the ordinary rotation of the wheel.

In testimony whereof we have signed our names to this specification in the presence of two subscribing witnesses.

WILLARD LE GRAND BUNDY.
ALONZO R. BOYNTON.

Witnesses:
HARLOW E. BUNDY,
A. WARD FORD.